United States Patent [19]

Mahr

[11] Patent Number: 5,400,648
[45] Date of Patent: Mar. 28, 1995

[54] PROCESS AND DEVICE FOR MEASURING THE VARIATION IN INTERNAL PRESSURE IN THE CYLINDER OF A PISTON ENGINE

[75] Inventor: Bernd Mahr, Altbach, Germany

[73] Assignee: Forschungsinstitut fur Kraftfahrwesen, Stuttgart, Germany

[21] Appl. No.: 916,996

[22] PCT Filed: Feb. 28, 1991

[86] PCT No.: PCT/EP91/00369
§ 371 Date: Apr. 1, 1993
§ 102(e) Date: Apr. 1, 1993

[87] PCT Pub. No.: WO91/13333
PCT Pub. Date: Sep. 5, 1991

[30] Foreign Application Priority Data

Feb. 28, 1990 [DE] Germany .................. 40 06 273.2

[51] Int. Cl.$^6$ ............................................. G01M 15/00
[52] U.S. Cl. ............................................. 73/115
[58] Field of Search .............. 73/115, 47, 114, 119 A

[56] References Cited

U.S. PATENT DOCUMENTS

| | | | |
|---|---|---|---|
| 2,810,517 | 10/1957 | Wright | 235/183 |
| 3,978,719 | 9/1976 | Hadden et al. | 73/115 |
| 4,109,518 | 8/1978 | Dooley et al. | 73/119 A |
| 4,525,781 | 6/1985 | Konomi et al. | 73/115 |
| 4,606,312 | 8/1986 | Nakano et al. | 123/198 DB |
| 4,860,707 | 8/1989 | Ohata | 123/339 |

FOREIGN PATENT DOCUMENTS 1083543 9/1967 United Kingdom .................. 73/115

OTHER PUBLICATIONS

Automotive Engineering, Jul. 1977, vol. 85, No. 7, *Cylinder Pressures Studied On-Line*, pp. 53–55.

*Primary Examiner*—Hezron E. Williams
*Assistant Examiner*—James M. Olsen
*Attorney, Agent, or Firm*—Ostrolenk, Faber, Gerb & Soffen

[57] ABSTRACT

In order to determine the course of a varying internal pressure in the cylinder of a piston-type internal combustion engine using measurement sensors which are in interaction with the outside of the cylinder; an acceleration, velocity or displacement signal ($X(t)$) is produced and a transfer function ($H(\omega)$) between the internal pressure ($Y(t)$) and the acceleration, velocity or displacement signal ($X(t)$) is determined once and thereafter an output signal representing the internal pressure is derived only from the acceleration, velocity or displacement signal $X(t)$) and the transfer function.

18 Claims, 3 Drawing Sheets

PROCESS AND DEVICE FOR MEASURING THE VARIATION IN INTERNAL PRESSURE IN THE CYLINDER OF A PISTON ENGINE

BACKGROUND OF THE INVENTION

The present invention refers to a method of determining the course of a varying internal pressure in a cylinder of a piston engine, particularly an internal combustion engine of the piston type, as well as a device for the carrying out of the method.

Upon the inspection and adjustment of piston engines, particularly internal combustion engines of the piston type, a knowledge of the variation with time of the internal pressure over a revolution of the crank shaft is of essential importance both for the development of such piston engines and for their routine inspection and/or control.

In order to determine this variation of the internal pressure, measurement sensors arranged generally within the cylinder were heretofore necessary, this representing an expensive solution since these measurement sensors are subjected to the entire combustion pressure and the entire combustion temperature. The cost of such measurement sensors would be too great in series production, so that measurement sensors arranged fixed in position in the inside of the cylinder are used only in special cases.

From U.S. Pat. No. 4,109,518, it is furthermore known to fasten an injection nozzle acted on by the internal pressure by holding means into which a force measurement cell is inserted. The force signal supplied by the force measurement cell is in this connection substantially proportional to the internal pressure, but this solution can be used only in the case of certain types of manufacture and attachment of the injection nozzles and it is necessary to use a firmly attached force measurement cell for each cylinder of the internal combustion engine, which results in considerable expense.

Measurements of the variation with time of the internal pressure, however, provide valuable information for the adjustment and testing or maintenance of internal combustion engines and also in the routine operation of internal combustion engines with electronic control, which information was heretofore not available in many cases due to the high expense.

The object of the present invention is to provide a method and a device of the aforementioned type which, while of simple construction and low cost, permits a determination of the course of the varying internal pressure in a cylinder of a piston engine within the time domain of the combustion of interest.

SUMMARY OF THE INVENTION

By the development of the method and device in accordance with the invention an easy determination of the course of the varying internal pressure upon the routine operation of the piston engine is possible since the transfer function between the internal pressure and the acceleration, velocity, or displacement signal need be determined only once and this transfer function can then be used, in combination with the acceleration, velocity, or displacement signal, for the routine determination of the variation of the internal pressure within the crank angle range of the combustion.

Particularly in series piston engines, it can be assumed that this transfer function is, in good approximation, the same for all piston engines of a manufacturing series, so that it need be determined only once on one piston engine of the series.

In routine operation, upon the adjustment, maintenance and control of these piston engines, it is then sufficient to detect the acceleration, velocity or displacement signal on the outside of the cylinder by means of measurement sensors which operate either without contact or in direct contact with the cylinder.

BRIEF DESCRIPTION OF THE DRAWINGS

The invention will be explained in further detail below on basis of embodiments shown in the drawing.

In the drawing.

DETAILED DESCRIPTION

Figure 1:
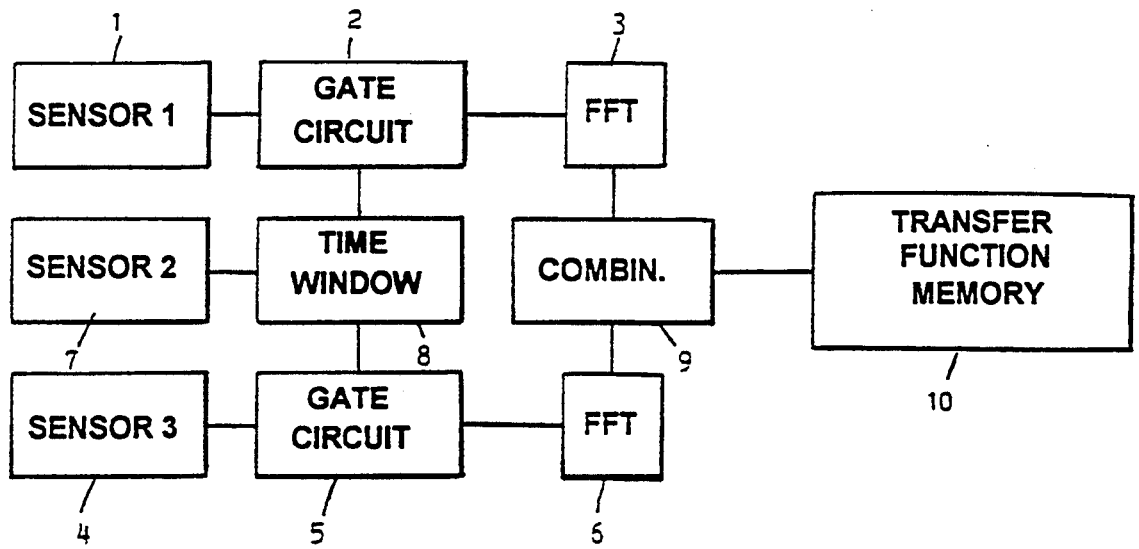
FIG. 1 shows an embodiment of the device for the carrying out of the method for the determination of the transfer function.

FIG. 1 shows an embodiment of the device by means of which the transfer function can be ascertained.

A measurement sensor 1 which supplies an acceleration, velocity or displacement signal on the outside of the cylinder of the piston engine is connected to the input of a first gate circuit 2. The measurement sensor 1 can either be a measurement sensor which is attached directly to the outside of the cylinder, for instance a strain gauge which is preferably fastened to a cylinder head bolt, or this measurement sensor can, for instance, be a laser Doppler measuring device, the laser beam of which is directed onto one or successively several points on the outside of the piston engine, for instance on an engine block or its cylinder head, in order to produce an acceleration, velocity or displacement signal of said point.

FIG. 1 furthermore shows a second measurement sensor 4 which is necessary merely for ascertaining the transfer function and makes direct measurement of the internal pressure in the cylinder possible.

Finally, there is also provided a third measurement sensor 7 by which a signal corresponding to the crank shaft angle degree can be recorded or calculated. The output signal of the second measurement sensor 4 is also fed to a gate circuit 5, the two gate circuits being controlled via a time-window circuit 8 as a function of the measurement sensor 7 so that only a part of the variation with time of the output signals of the measurement sensors 1 and 4 is transmitted further over a full revolution of the crank shaft. The output signals of the gate circuits 2 and 5 are fed to separate transformation circuits 3, 6 which are formed by FFT transformation circuits which transform the signals supplied by the measurement sensors 1, 4 and forwarded via the gate circuits 2, 5 from the time domain into the frequency domain. By the gate circuits 2, 5 there is thus obtained a multiplication of the measurement-sensor time signals by a window function, which window function may, for instance, be a rectangular window or preferably a Hanning window with plateau. Due to the fact that the control of the time-window circuit 8 takes place as a function of the crank angle, distortion signals can be masked out in regions which are not of interest.

The output signals of the transformation circuits 3, 6 are fed to a combination circuit 9 which will be explained further with reference to FIG. 3 and the output signal of which forms the transfer function, which is then stored in a memory 10 for subsequent use.

As has been mentioned at the start, this transfer function need be determined only once since it remains sufficiently constant for a given type of piston engine and a given arrangement of the measurement sensor 1. Special transfer functions can possibly be determined and stored for different operating points.

Furthermore, it is sufficient, for instance in the case of series engines, to determine the transfer function merely for a single piston engine, whereupon this transfer function can then be used in general for all piston engines of the same series.

The use of a measurement sensor 4 for the internal pressure itself is thus necessary merely for determining the transfer function.

Figure 2:
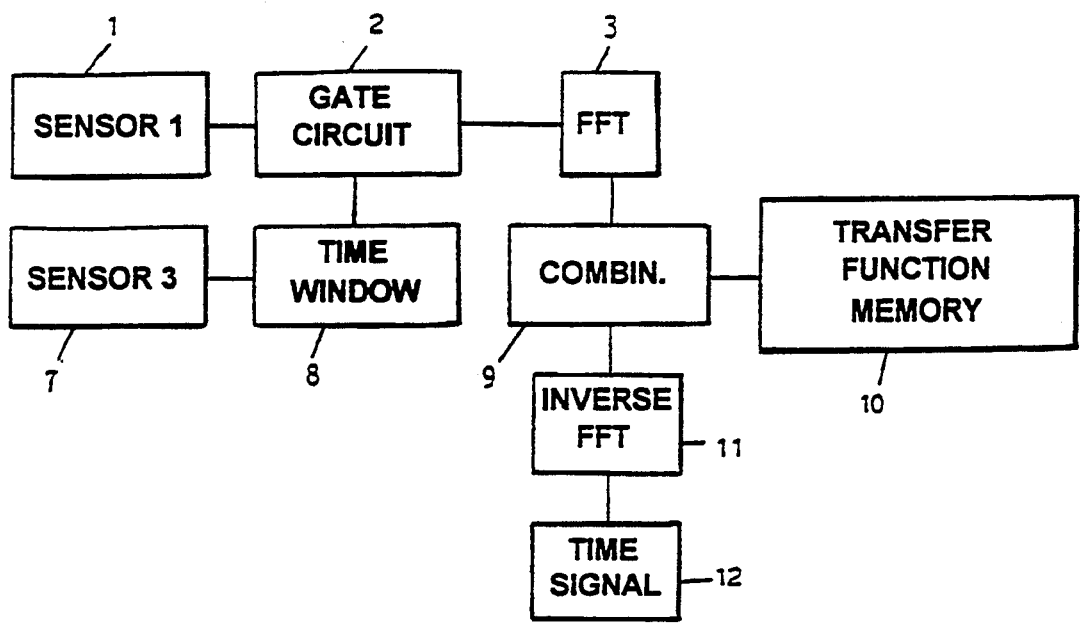
FIG. 2 shows an embodiment of the device for deriving the signal representing the internal pressure from the acceleration, velocity or displacement measurement-sensor signals.

This can be noted, in particular, from FIG. 2, which shows an embodiment of the device for determining a signal representing the internal pressure. In this case, also, the same measurement sensor 1 followed by gate circuit 2 and transformation circuit 3 as in FIG. 1 is used. In the same way, a time-window circuit 8 controlled by a measurement sensor 7 is used, it controlling the gate circuit 2 and selecting the crank angle range. The output signal of the transformation circuit 3 is fed to a combination circuit in which this output signal is combined with the transfer function stored in the memory 10. The output signal of the combination circuit 9 is a signal lying in the frequency domain, which signal is then fed to a third transformation circuit 11 which has a function inverse to the transformation circuit 3 and transforms the signal back into the time domain and thus supplies an output signal which represents the course of the internal pressure 12.

Figure 3:
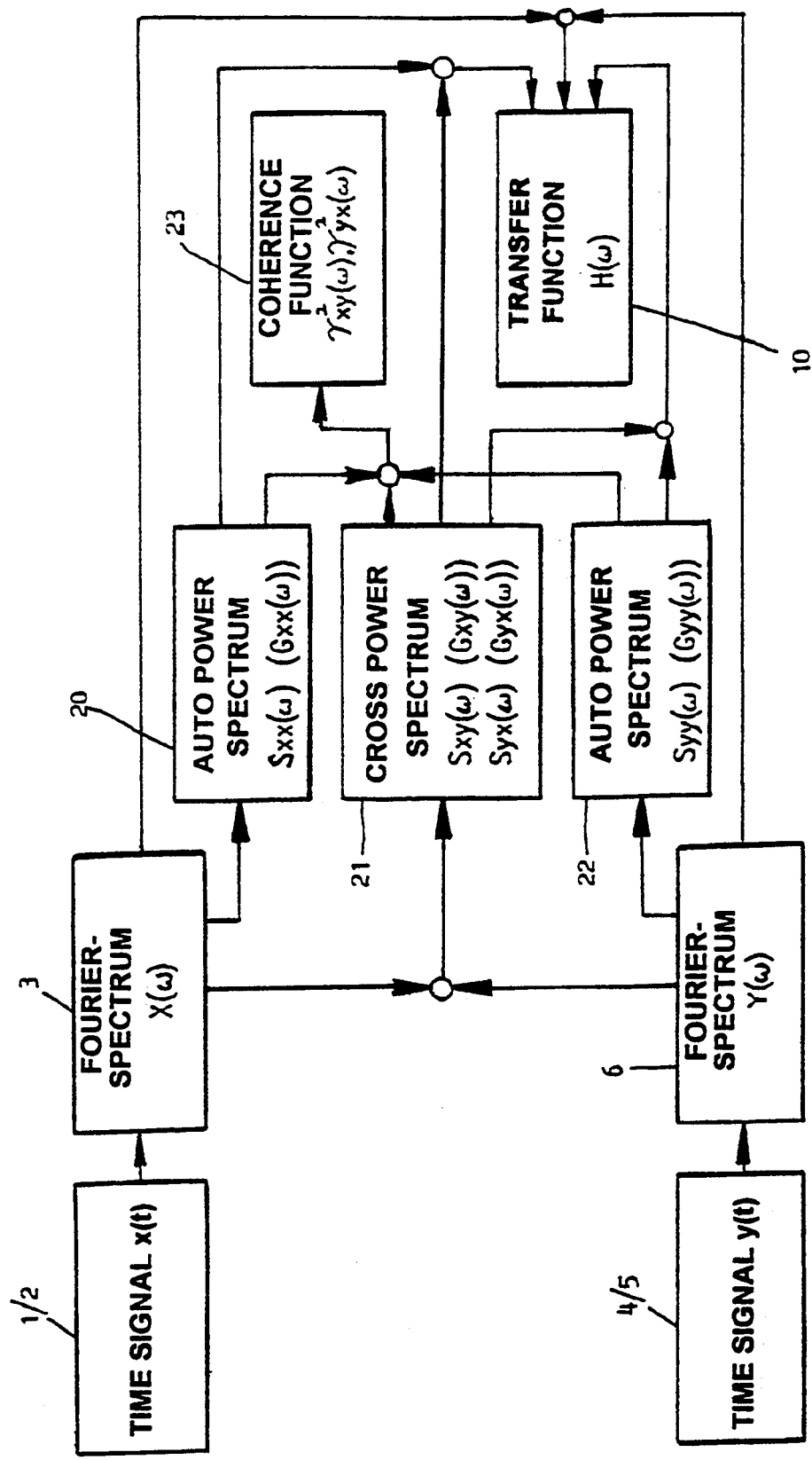
FIG. 3 shows an embodiment serving to explain the embodiments of the combination circuit of FIGS. 1 and 2.

FIG. 3 shows an embodiment of the combination circuits 9 used in FIGS. 1 and 2. As can be noted from FIG. 3, the time signal x(t) supplied by the measurement sensor 1 and the gate circuit 2 for the acceleration or the velocity or the displacement of a point on the outside of the cylinder is converted in the transformation circuit 3 into a Fourier spectrum $X(\omega)$, while the time signal of the internal pressure y(t) which is supplied by the measurement sensor 4 for the internal pressure and conducted further by the gate circuit 5 is fed to the transformation circuit 6, in which a Fourier spectrum $Y(\omega)$ thereof is produced.

For the combining of the signals $X(\omega)$ and $Y(\omega)$ lying in the frequency domain, three possibilities then result in principle:

1. The cross power spectrum $S_{xy}(\omega)$ is produced in the cross power spectrum circuit 21 from the signals $X(\omega)$ and $Y(\omega)$. At the same time, the auto power spectrum $S_{xx}(\omega)$ of $X(\omega)$ is produced in the auto power spectrum circuit 20. From the cross power spectrum and the auto power spectrum, the transfer function $H(\omega)$ is then calculated.
2. Another possibility consists in calculating the cross power spectrum $S_{yx}(\omega)$ in the cross power spectrum circuit 21 and the auto power spectrum $S_{yy}(\omega)$ of $Y(\omega)$ in the auto power spectrum circuit 22, from which the transfer function $H(\omega)$ is again calculated from these values.
3. Another possibility consists in calculating the transfer function directly from the Fourier spectrums $X(\omega)$ and $Y(\omega)$. This method is only useful if there is very good coherence, i.e. this coherence in the ideal case amounts to 1.

Figure 4:
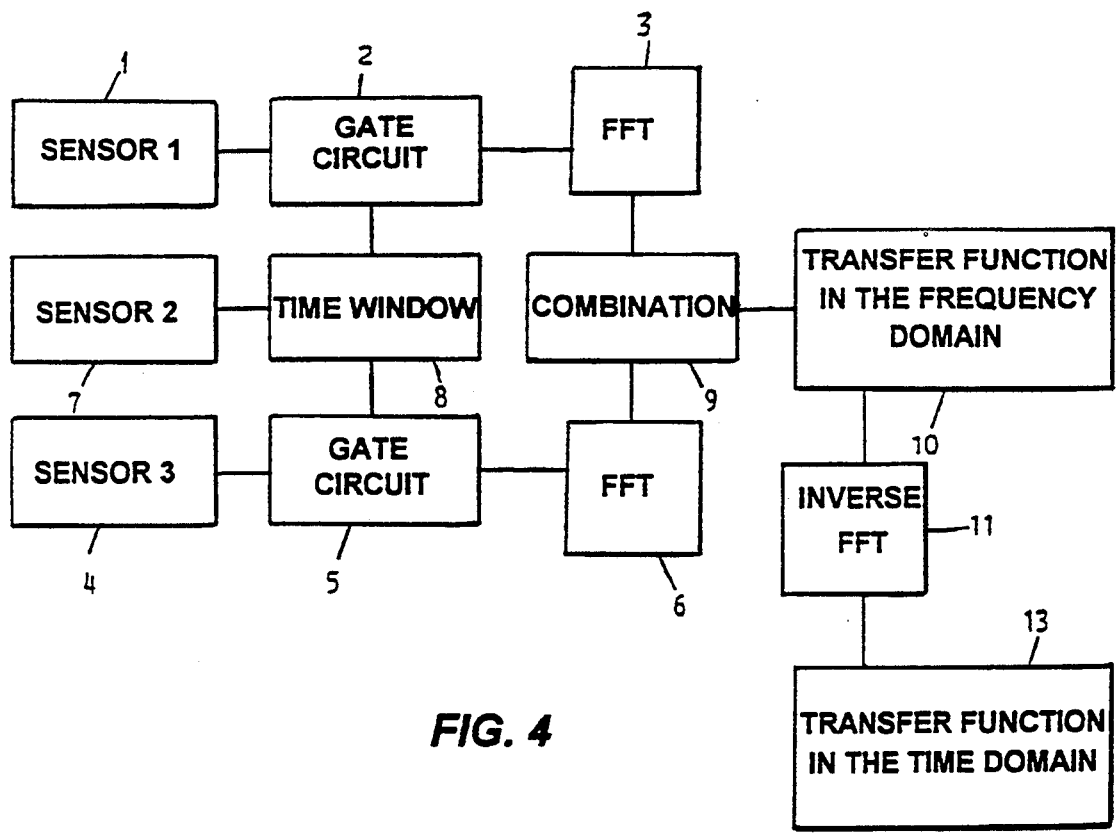
FIG. 4 shows a modified embodiment of the device of FIG. 1.
Figure 5:
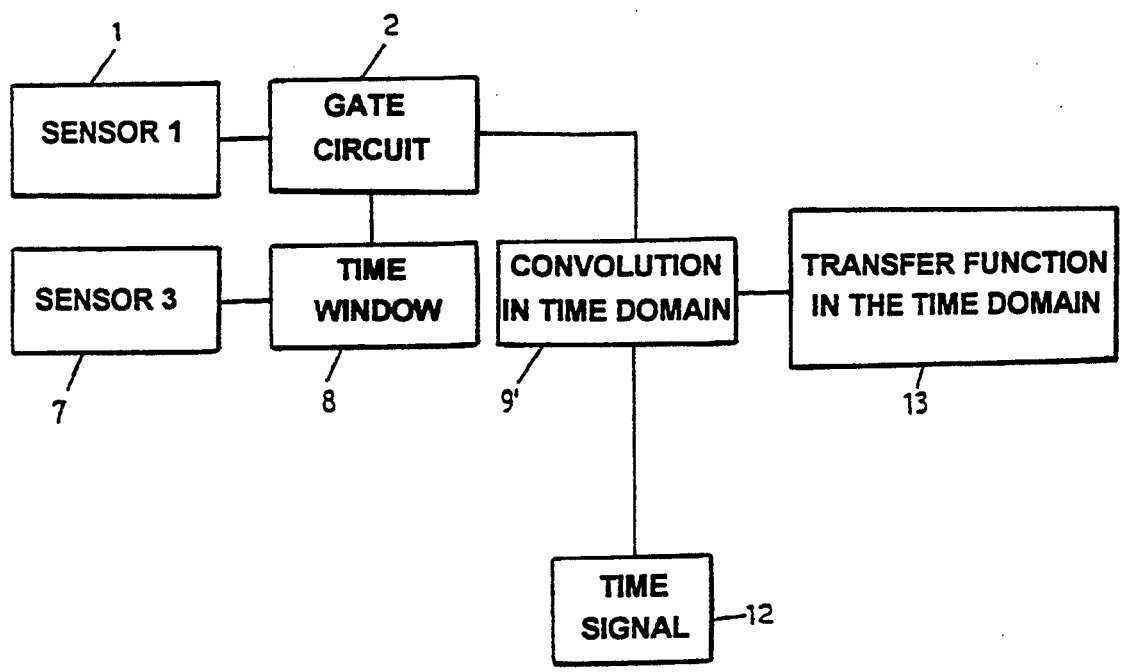
FIG. 5 shows a modified embodiment of the device according to FIG. 2.

FIGS. 4 and 5 show another embodiment of a device for carrying out the method for determining the transfer function or for deriving the signal representing the internal pressure from the acceleration, velocity or displacement measurement-sensor signals.

The circuit of FIG. 4 corresponds essentially to the circuit of FIG. 1, except that the transfer function stored in the memory 10 is transformed to the time domain via a circuit 11 for the inverse Fourier transformation and stored in the memory 13, the transfer function stored in the memory 13 representing the pulse response in the time domain.

In corresponding fashion, then, in the case of the circuit according to FIG. 5, which is similar to the circuit of FIG. 2, the Fourier transformation circuit 3 can be omitted and the output signal of the gate circuit 2 subjected in the circuit 9' directly to a convolution operation with the transfer function in the time range (pulse response) stored in the memory 13, in order to produce the signal representing the variation of the internal pressure of the internal combustion engine.

All of the circuits of FIGS. 1–5 which serve for the evaluation of the measurement-sensor signals can be developed in the form of integrated circuits and simple calculation circuits and memory circuits so that the expense is relatively slight.

Due to the fact that in routine operation only a measurement sensor cooperating with the outside of the cylinder is necessary, a simple arrangement is obtained which can be used for both adjustment and maintenance work on piston engines, in which connection, furthermore, continuous use of the circuit of FIG. 2 in order to monitor and control such piston engines is possible since, in this way, for instance, the course of the combustion of a piston engine can be optimally adjusted.

With the robust and economical system described the following verifications and optimalizations of piston engines can for instance be effected in routine operation:

Adaptation of the start of the injection of a diesel engine to the corresponding cetane number of the fuel and to the temperature conditions prevailing in the combustion chamber, Monitoring of a multicylinder engine with respect to dependable operation of all cylinders.

Although the present invention has been described in relation to particular embodiments thereof, many other variations and modifications and other uses will become apparent to those skilled in the art. Therefore, the present invention should be limited not by the specific disclosure herein, but only by the appended claims.

I claim:

1. A method of determining the course of a varying internal pressure in a cylinder of a piston engine, in particular a combustion engine of the piston type, comprising the steps of measuring with a first measurement sensor an acceleration, velocity or displacement signal (x(t)), the first measurement sensor being arranged on the outside of the cylinder such that the signal (x(t)) produced by it represents the acceleration, the velocity or the displacement of one or more points on the outside of the cylinder;

determining initially and only once, a transfer function ($H(\omega)$) which represents the relationship of the acceleration, velocity or displacement signal ($x(t)$) to the internal pressure; and deriving an output signal representing the course of the varying internal pressure in a cylinder of the piston engine thereafter merely from the acceleration, velocity or displacement signal ($x(t)$) determined by the first measurement sensor arranged on the outside of the cylinder and from the once determined transfer function ($H(\omega)$) for the piston engine.

2. A method according to claim 1, further comprising in order to determine the transfer function ($H(\omega)$), the steps of:

determining the acceleration, velocity or displacement signal ($x)t)$) as a time signal;

determining an internal pressure signal ($y(t)$) by direct measurement of the internal pressure with an internal second measurement sensor as a time signal; and transforming said time signals from the time domain into the frequency domain.

3. A method according to claim 2, further comprising generating the cross power spectrum ($S_{xy}(\omega)$) of the signals ($x(\omega), y(\omega)$) transformed into the frequency domain and the auto power spectrum of ($S_{xx}(107 )$) of the signal ($x(\omega)$) obtained by transformation of the acceleration, velocity or displacement signal ($x(t)$) into the frequency domain and calculating from the cross power spectrum and the auto power spectrum the transfer function ($H(\omega)$).

4. A method according to claim 2, further comprising generating the cross power spectrum ($S_{xy}(\omega)$) of the signals ($x(\omega), y(\omega)$) transformed into the frequency domain and the auto power spectrum of ($S_{xx}(\omega)$) of the signal ($y(\omega)$) obtained by transformation of the internal pressure signal ($y(t)$) into the frequency domain and calculating from the cross power spectrum and the auto power spectrum the transfer function ($H(\omega)$).

5. A method according to claim 2, further comprising generating the transfer function ($H(\omega)$) directly from the signals ($x(\omega), y(\omega)$) transformed into the frequency domain.

6. A method according to claim 2, further comprising multiplying the time signal ($x(t)$) representing the acceleration, the velocity or the displacement and the time signal ($y(t)$) representing the internal pressure each by a time window function before the transformation into the frequency domain so that only a part of the variation with time of the time signals ($x(t), y(t)$) of a full revolution of the piston engine crank shaft is used for generating the transfer function.

7. A method according to claim 1, further comprising, for the derivation of the output signal which represents the internal pressure, transforming the time signal ($x(t)$) which represents the acceleration, the velocity or the displacement into the frequency domain, combining said signal ($x(t)$) with the transfer function to form a combined signal and transforming said combined signal back into the time domain.

8. A method according to claim 1, further comprising calculating a further transfer function referred to as a pulse response by an inverse Fourier transformation of the transfer function ($H(\omega)$).

9. A method according to claim 8, further comprising, for the derivation of the output signal which represents the internal pressure, combining the time signal ($x(t)$) which represents the acceleration, the velocity or the displacement by a convolution in the time domain with the transfer function representing the pulse response in the time domain so as to produce an output signal which represents the internal pressure.

10. A method according to claim 1, further comprising obtaining the time signal ($x(t)$) which represents the acceleration, the velocity or the displacement from the cylinder head or engine block of the piston engine by means of strain gauges which are fastened on cylinder-head bolts.

11. A method according to claim 1, further comprising measuring the time signal ($x(t)$) which represents the acceleration, the velocity or the displacement in accordance with the Doppler effect by means of laser beams directed at given points of the piston engine.

12. A device for determining the course of a varying internal pressure in a cylinder of a piston engine, in particular a combustion engine of the piston type, comprising:

a first measurement sensor arranged on the outside of the cylinder of the piston engine, so that an acceleration, velocity or displacement signal ($x(t)$) is produced representing the acceleration, the velocity or the displacement of one or more points on the outside of the cylinder, a second measurement sensor for obtaining an internal pressure signal ($y(t)$) by direct measurement of the internal pressure, first and second transformation circuits for transforming the acceleration, velocity or displacement signal ($x(t)$) and the internal pressure signal ($y(t)$) from the time domain into the frequency domain, and a combining circuit for determining the transfer function ($H(\omega)$) from the output signals of the transformation circuits and a memory for storing the transfer function ($H(\omega)$).

13. A device according to claim 12, wherein the output signal of the measurement sensors for the acceleration, velocity or displacement signal ($x(t)$) and the internal pressure signal ($y(t)$) are fed to the input of the transformation circuits via separate gate circuits which can be controlled via a time window which is controlled by a third measurement sensor for the determination of the respective crank angle.

14. A device according to claim 12, further comprising a third transformation circuit for the retransformation of a signal established by combination of the signal ($x(\omega)$) obtained by transformation of the acceleration, velocity or displacement signal ($x(t)$) into the frequency domain with the transfer function ($H(\omega)$) stored in the memory, into the time domain, the output signal of the third transformation circuit forming the output signal which represents the course of the internal pressure.

15. A device according to claim 12, further comprising an inverse Fourier transformation circuit for transformation of the transfer function in the frequency domain into the time domain connected with the output of the memory, and a further memory for storing the transfer function which represents a pulse response connected in the time domain with the output of the inverse Fourier transformation circuit.

16. A device according to claim 15, further comprising a convolution circuit for combining the acceleration, velocity or displacement signal ($x(t)$) with the transfer function which represents the pulse response stored in the further memory, the output signal of the convolution circuit forming the output signal representing the course of the internal pressure.

17. A device according to claim 12, wherein the first sensor comprises, a strain gauge fastened to the cylinder head bolts of the piston engine and supplying the acceleration, velocity or displacement signal (x(t)).

18. A device according to claim 12, wherein the first sensor comprises a laser Doppler measuring device provided at predetermined points of the piston engine for measuring the acceleration, velocity or displacement signal (x(t)).

* * * * *